United States Patent [19]
Darby

[11] Patent Number: 5,144,910
[45] Date of Patent: Sep. 8, 1992

[54] DOG TRANSPORTATION BOX WITH REMOVABLE SIDE WALL AND METHOD

[76] Inventor: Steven S. Darby, P. O. Box 73, Anderson, S.C. 29622

[21] Appl. No.: 609,743

[22] Filed: Nov. 6, 1990

[51] Int. Cl.$^5$ ............................................. A01K 1/02
[52] U.S. Cl. .............................................. 119/17; 119/19
[58] Field of Search ........................... 119/19, 17, 15

[56] References Cited

U.S. PATENT DOCUMENTS

| | | | |
|---|---|---|---|
| 4,552,93 | 11/1985 | Puckett | 119/17 |
| 1,101,427 | 6/1914 | Gaeth | 119/19 |
| 1,217,796 | 2/1917 | McFarland | 119/19 |
| 3,234,908 | 2/1966 | Doskocil | 119/19 |
| 3,490,417 | 1/1970 | Swinney | 119/19 |
| 3,791,347 | 2/1974 | Lovell | 119/19 |

FOREIGN PATENT DOCUMENTS

| | | | |
|---|---|---|---|
| 190957 | 8/1964 | Sweden | 119/17 |
| 3757 | of 1901 | United Kingdom | 119/17 |
| 225405 | 12/1924 | United Kingdom | 119/19 |
| 657770 | 9/1951 | United Kingdom | 119/19 |

*Primary Examiner*—John G. Weiss
*Assistant Examiner*—Todd E. Manahan
*Attorney, Agent, or Firm*—Bailey & Hardaway

[57] ABSTRACT

A dog transportation box has an upright ventilated side wall A contructed of spaced vertical slats provided with an upper frame member D into which an imperforate side wall C is first inserted prior to lowering same into a lower frame member E thus converting a ventilated dog transportation box into an imperforate or sealed dog transportation box for use depending on weather conditions.

7 Claims, 2 Drawing Sheets

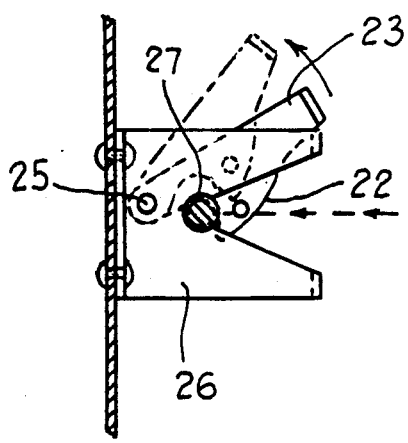
Fig. 3.
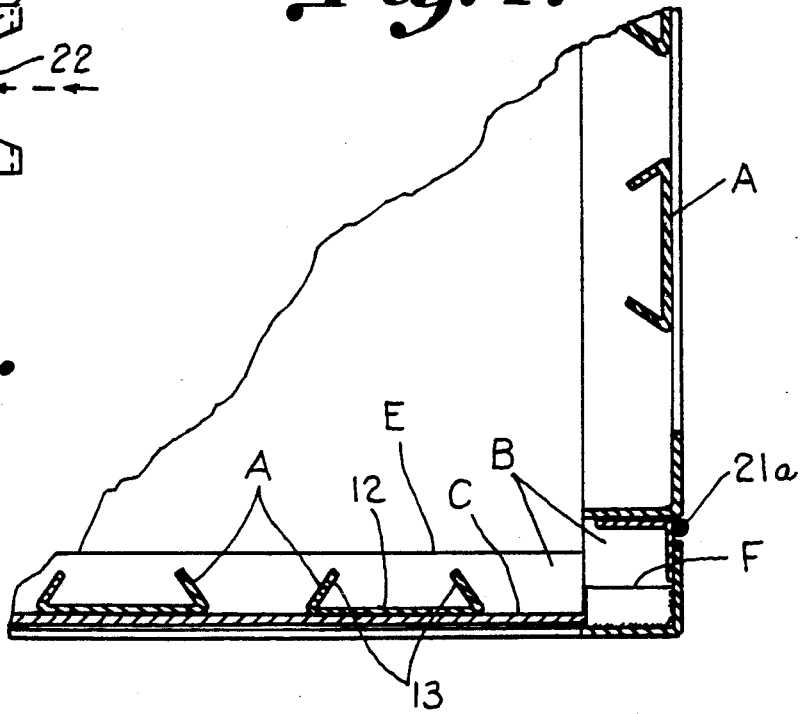
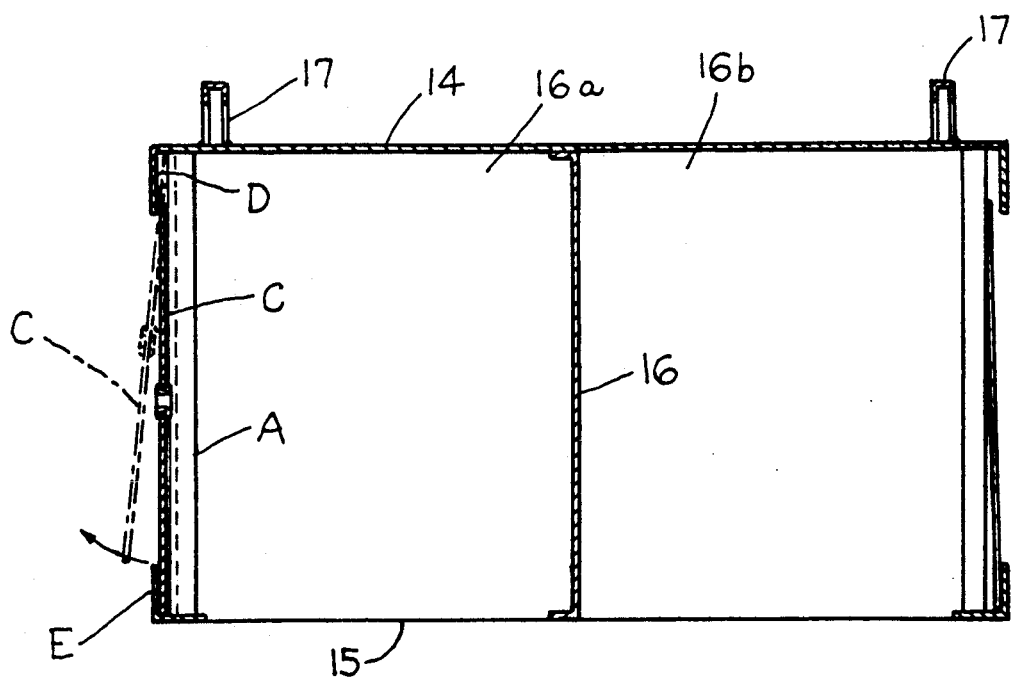

DOG TRANSPORTATION BOX WITH REMOVABLE SIDE WALL AND METHOD

BACKGROUND OF THE INVENTION

This invention relates to a dog transportation box which is convertible from a ventilated box for use for transporting dogs in the summer to an imperforate or closed box in transporting animals during the winter and during inclement weather.

Ventilated dog transportation boxes having ventilated sides constructed of vertical slats have been provided heretofore. Such transportation boxes are illustrated in U.S. Pat. No. 4,256,056. A cabinet useful as an air handling enclosure is illustrated in U.S. Pat. No. 4,776,484 wherein an insulated sealed side wall is permanently installed by inserting an upper end within an upper frame member and then pushing the side wall downwardly to be retained within a lower frame member. The imperforate side wall closure is permanently locked into position by sealing ribs which deform the insulation fixing the sealed side wall panel within the frame members.

SUMMARY OF THE INVENTION

It has been found that a convertible dog box may be provided wherein the side walls are constructed of vertical slats with provision for positioning an imperforate outer side wall in overlying relation thereto. An imperforate side wall is first pushed upwardly into a depending upper frame member and then lowered to the imperforate side wall into an upright lower frame member where it is removably retained. Stops are provided for limiting lateral movement of the imperforate outer side wall within the retaining upper and lower frame members. Conversely, the imperforate side wall may be removed by first raising same so that the top of the imperforate side wall is again disposed in an upper portion of the upper frame member for first removing a lower edge of the imperforate side wall from the lower frame member releasing the side wall. This step is followed by removal of the imperforate side wall thus released.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a side elevation further illustrating the door fastener of FIG. 2;

FIG. 4 is a longitudinal sectional elevation taken on the line 4—4 in FIG. 1; and FIG. 5 is a transverse sectional elevation taken on the line 5—5 in FIG. 1.

DESCRIPTION OF A PREFERRED EMBODIMENT

Figure 1:
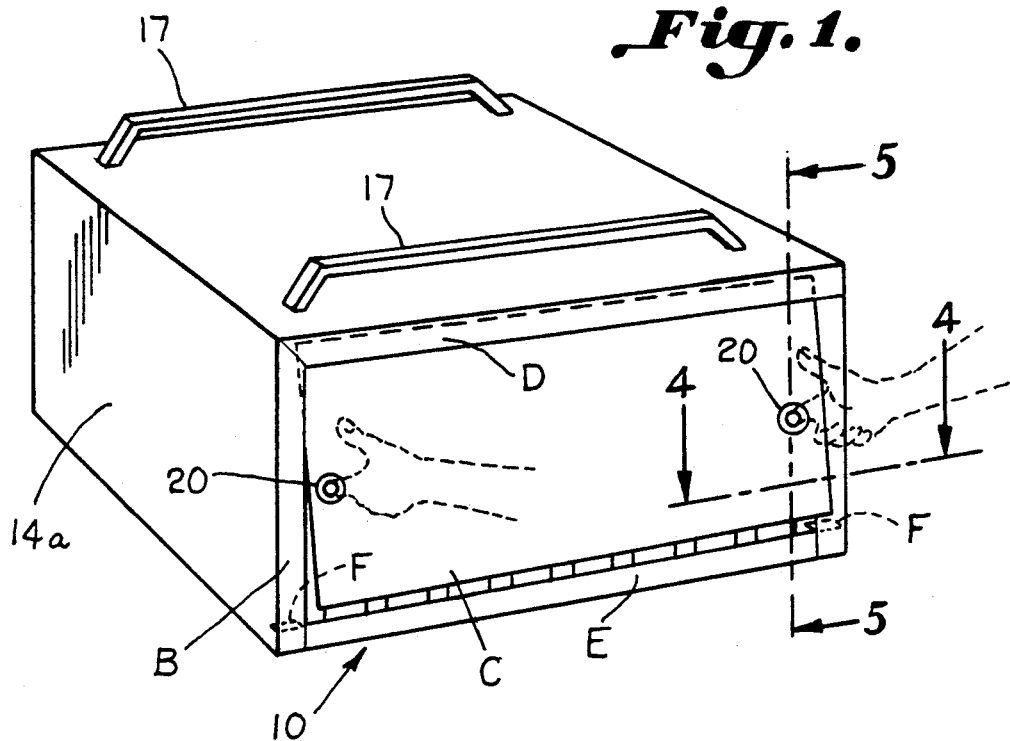
FIG. 1 is a perspective view illustrating an imperforate outer side wall being positioned in overlying relation to an inner ventilated wall in accordance with the invention.
Figure 2:
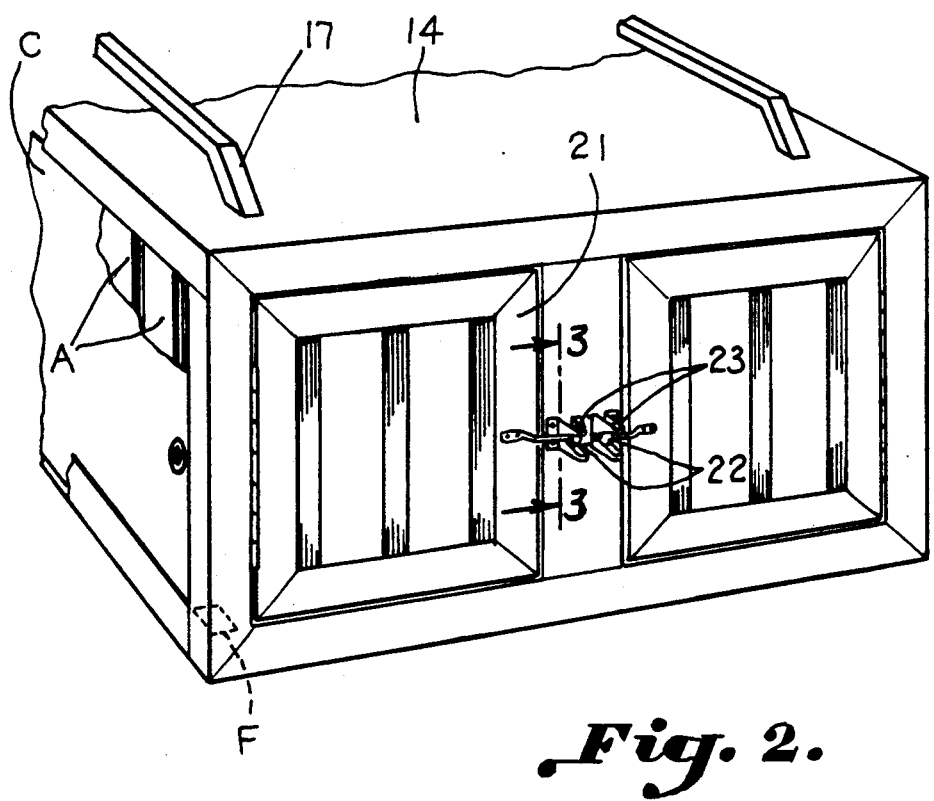
FIG. 2 is a perspective view illustrating a door for use in the dog transportation box.

A convertible dog transportation box has an upright rectangular ventilated side wall constructed of spaced vertical slats A. A side frame member B carries the rectangular ventilated side wall in recessed relation thereto. A substantially imperforate outer side wall C and a depending upper frame member D are carried by the side frame member receiving a top of the outer side wall therebehind so as to aid in positioning same in overlying relation to the ventilated side wall. An upright lower frame member E is carried by the side frame member receiving a bottom of the outer side wall therebehind positioning same in overlying relation to the ventilated side wall. The upper frame member D has a greater depth dimension than the lower frame member E. Thus, the dog transportation box may be converted from ventilated to imperforate by installing the imperforate outer side wall C by first inserting the top of the outer side wall behind the upper frame member D and then lowering the bottom of the outer side wall behind the upright lower frame member E. A pair of longitudinally spaced stops F position the imperforate outer side wall C therebetween.

As best illustrated in FIGS. 4 and 5, the upright rectangular ventilated side walls are constructed of spaced vertical ribs A which are welded to upper and lower frame members D and E respectively (FIG. 5). The vertical slats A have a web section 12 and a pair of legs 13 integral therewith. The dog transportation box includes a top 14, a bottom 15 and an imperforate 16 forming compartments 16a and 16b, each having slatted sides and consisting of an open bottom between the lower frame members E. At the top of the dog transportation box are a pair of transversely spaced handles 17 or hand rails (FIGS. 1 and 5) for manually lifting and positioning the dog box as in and out of a pickup truck. The depending upper frame member D extends downwardly, for example, for 2½". The upwardly facing lower frame member E extends upwardly, for example, at 2" permitting the insertion of the imperforate outer side wall C upwardly between the depending flange of the upper frame member D and the vertical slats so as to press upwardly against the remote part of the frame 10 before the imperforate wall C is lowered between the upwardly extending of lower frame member E and the slatted ventilated side walls A.

Referring to FIGS. 1 and 4, a pair of longitudinally spaced stops F are illustrated as being carried at the ends of the upwardly extending lower frame member E so as to limit the lateral movement of the imperforate panel C when positioned between the upper and lower frame members D and E, respectively.

FIG. 1 best illustrates the position of the imperforate outer side wall between the upper and lower frame members. In this position, the fingers are placed in holes defined by rubber grommets 20. The box is illustrated as having a front door 21 opposite the back 14a of the dog box for each compartment of the dog box formed by the divider 16. Each door has a hinge 21a. Each door has a suitable door fastener 22 which is illustrated as being carried by a latch 23. The latch 23 is pivoted as at 25 in the bracket 26 for confining the latch on the locking bar 27 therein.

While a preferred embodiment of the invention has been described using specific terms, such description is for illustrative purposes only, and it is to be understood that changes and variations may be made without departing from the spirit or scope of the following claims.

What is claimed is:

1. A convertible dog transportation box having an upright rectangular ventilated side wall and comprising:
   a side frame member carrying said rectangular ventilated side wall in recessed relation thereto, said ventilated side wall being constructed of longitudinally spaced vertical structural members extending from a top to a bottom of said box, each of said members having a web section and legs for providing structural support of said box as well as retention of a dog within said box;
   a substantially imperforate outer side wall;
   a depending upper frame member having a first flange, carried by said side frame member and receiving a top of said outer side wall behind said first flange thereby aiding in positioning said outer side wall in overlying relation to said ventilated side wall; and
   an upright lower frame member having a second flange, carried by said side frame member and receiving a bottom of said outer side wall behind said second flange positioning said outer side wall in overlying relation to said ventilated side wall; a depth dimension of said first flange being greater than a depth dimension of said second flange;
   said side frame member including upright frame members extending in alignment with and connecting said upper and lower frame members;
   whereby said dog transportation box may be converted from ventilated to imperforate by installing said imperforate outer side wall by first inserting said top of said outer side wall behind said upper frame member and then lowering the bottom of said outer side wall behind said upright lower frame member.

2. The structure set forth in claim 1 including a pair of longitudinally spaced stops positioning said imperforate outer side wall therebetween.

3. The structure as set forth in claim 2 including a top having a given length, an imperforate divider completely separating an interior portion of said box into two compartments having slatted sides and an open bottom, and a pair of spaced longitudinal hand rails extending substantially along the length of said top for lifting the box.

4. The structure set forth in claim 3 further comprising a door at a front end of each of said compartments.

5. The structure as set forth in claim 4 further comprising a grommet disposed within an aperture formed within said substantially imperforate outer side wall.

6. A method of converting a ventilated dog transportation box having an inner upright rectangular ventilated side wall to a substantially imperforate dog transportation box comprising the steps of:
   carrying said inner rectangular ventilated side wall in recessed relation to a side frame member;
   providing said ventilated side wall with longitudinally spaced vertical structural members extending from a top to a bottom of said box;
   providing each of said members with a web section and legs for providing structural support of said box as well as retention of a dog within said box;
   providing a substantially imperforate outer side wall;
   providing a depending upper frame member having a first flange, carried by said side frame member and receiving a top of said outer side wall behind said first flange thereby aiding in positioning said outer side wall in overlying relation to said inner side wall;
   carrying an upright lower frame member having a second flange by said side frame member receiving a bottom of said outer side side wall behind said second flange positioning said outer side wall in overlying relation to said inner side wall;
   providing said first flange with a greater depth dimension than that of said second flange; and
   installing said imperforate outer side wall by first inserting said top of said outer side wall behind said upper frame member and then lowering the bottom of said outer side wall behind said upright lower frame member so that said dog transportation box may be provided with an imperforate side wall.

7. The method set forth in claim 6 including the steps of constructing said ventilated side wall of longitudinally spaced vertical slats, and limiting lateral movement of said outer side wall within said upper and lower frame member by providing a pair of longitudinally spaced stops positioning said imperforate outer side wall therebetween.

* * * * *